United States Patent
Alan

(10) Patent No.: US 6,360,991 B1
(45) Date of Patent: Mar. 26, 2002

(54) MOTORIZED PARAGLIDER WITH AUTOMATIC STEERING SYSTEM FOR PREVENTING UPSET

(76) Inventor: Scott Alan, P.O. Box 423217, Kissimmee, FL (US) 34742

( * ) Notice: Subject to any disclaimer, the term of this patent is extended or adjusted under 35 U.S.C. 154(b) by 0 days.

(21) Appl. No.: 09/658,630

(22) Filed: Sep. 8, 2000

(51) Int. Cl.⁷ ............................. B64C 25/32; B64C 1/00
(52) U.S. Cl. ............................. 244/103 W; 244/100 R; 244/903; 244/13
(58) Field of Search ............................. 244/903, 103 W, 244/100 R, 900, 901, 902, 13, 104 R

(56) References Cited

U.S. PATENT DOCUMENTS

| | | | |
|---|---|---|---|
| 2,529,933 A | * 11/1950 | Geisse | 244/103 W |
| 2,577,416 A | * 12/1951 | Geisse | 244/103 W |
| 4,875,642 A | * 10/1989 | Flynn | 244/903 |
| 4,934,630 A | * 6/1990 | Snyder | 244/903 |

* cited by examiner

*Primary Examiner*—J. Woodrow Eldred
(74) *Attorney, Agent, or Firm*—Stephen R. Greiner

(57) ABSTRACT

A motorized paraglider including a wheeled frame with a steerable nose wheel and a pair of casters arranged in a tricycle configuration. Each of the casters has a trailing wheel and a support bracket rotatably carrying the trailing wheel. A swivel mechanism is positioned atop the support bracket for permitting the trailing wheel to swivel about a substantially vertical axis. A stop is coupled with the support bracket for preventing the trailing wheel from swiveling inwardly. A spring is also coupled with the support bracket for normally urging the support bracket against the stop yet, under the influence of a sufficient lateral force, permitting the trailing wheel to swivel outwardly.

3 Claims, 2 Drawing Sheets

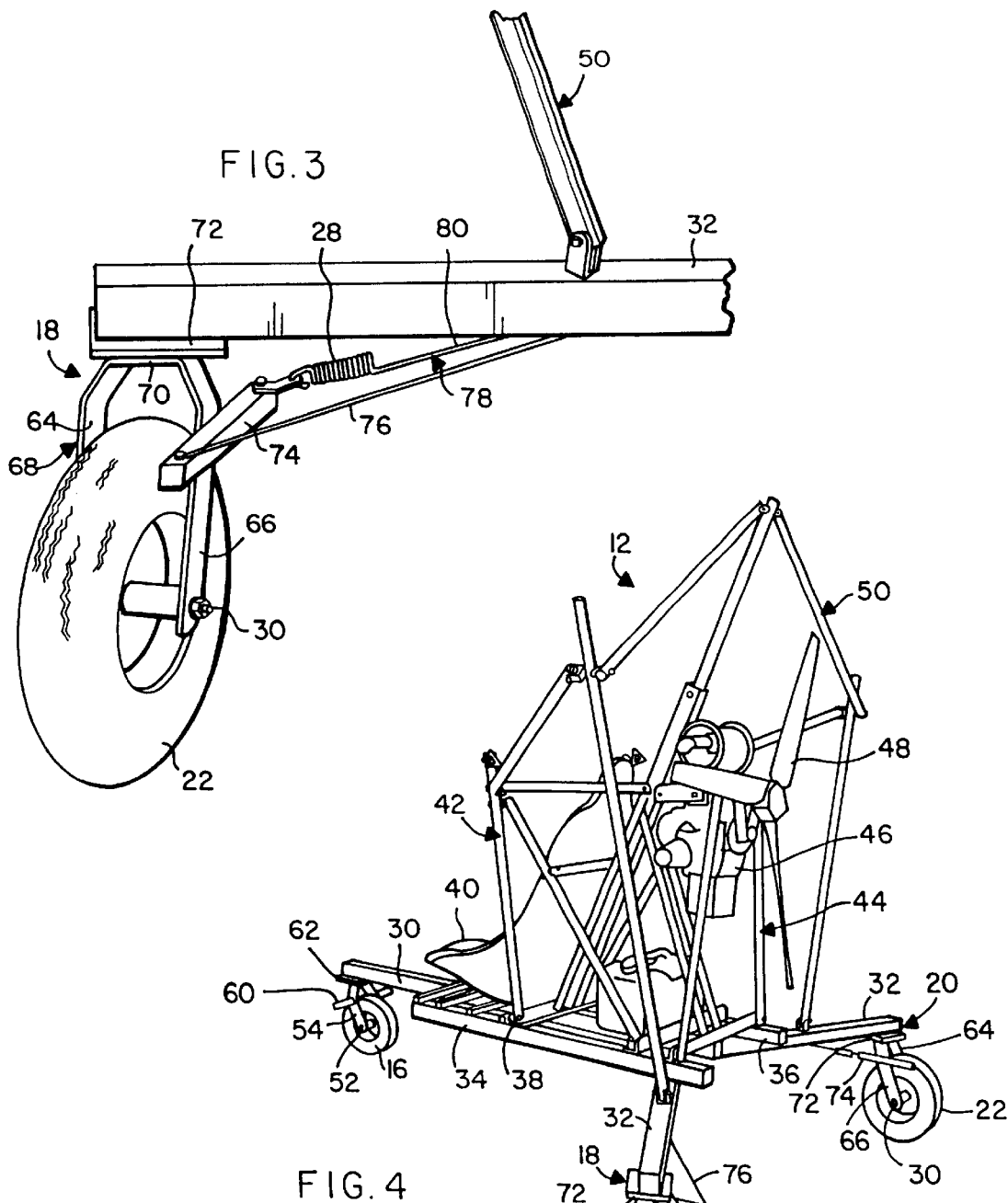

MOTORIZED PARAGLIDER WITH AUTOMATIC STEERING SYSTEM FOR PREVENTING UPSET

FIELD OF THE INVENTION

The present invention relates generally to lightweight, air vehicles having parachute-type wings and, more particularly, to apparatus for steering such vehicles on land.

BACKGROUND OF THE INVENTION

Crosswind takeoffs and landings with a motorized paraglider have always been tricky. Since the lift-generating parachute or canopy is positioned high above the pilot-carrying frame, a strong lateral gust can pull the canopy to one side and the frame with it. Should the gust be strong enough, the frame can be overturned on the ground with the likelihood of injury to both the pilot and paraglider being high.

Skilled pilots are often able to prevent their paragliders from being overturned by is quickly maneuvering their craft and by shifting their own weight. Such actions are not always successful and are fraught with peril when performed by inexperienced, paraglider pilots. The need, therefore, exists for motorized paraglider frame, useful to pilots of all skill levels, that resists rollover.

SUMMARY OF THE INVENTION

In light of the problems associated with the prior art, it is a principal object of the invention to provide a motorized paraglider with an automatic steering system that will prevent such from being overturned or upset when caught in a crosswind while maneuvering on the ground. The steering system is useful to paraglider pilots of all skill levels and will prevent harm to both pilots and paragliders.

It is an object of the invention to provide improved elements and arrangements thereof in a paraglider for the purposes described which is lightweight in construction, inexpensive to manufacture, and dependable in use.

Briefly, the paraglider in accordance with this invention achieves the intended objects by featuring a frame with a central spar and a pair of struts attached to the rear end of the central spar. A steerable nose wheel is secured to the central spar and a pair of casters is secured to the struts. Each of the casters has a trailing wheel and a support bracket rotatably carrying the trailing wheel. A swivel mechanism is positioned atop the support bracket for permitting the trailing wheel to swivel. A lever arm is attached to the support bracket. An inelastic tether connects the rearward end of the lever arm to the adjacent strut and has a length sufficient to prevent the trailing wheel from turning inwardly. An elastic tether connects the forward end of the lever arm to the adjacent strut and normally urges the rearward end of the lever arm against the pull of the inelastic tether. Under the influence of a sufficient lateral force, the elastic tether will stretch thereby permitting the trailing wheel to swivel outwardly.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 3 is a perspective view of one of the casters of the motorized paraglider.

FIG. 4 is a perspective view of the wheeled frame of the motorized paraglider.

Similar reference characters denote corresponding features consistently throughout the accompanying drawings.

DETAILED DESCRIPTION OF THE PREFERRED EMBODIMENT

Figure 1:
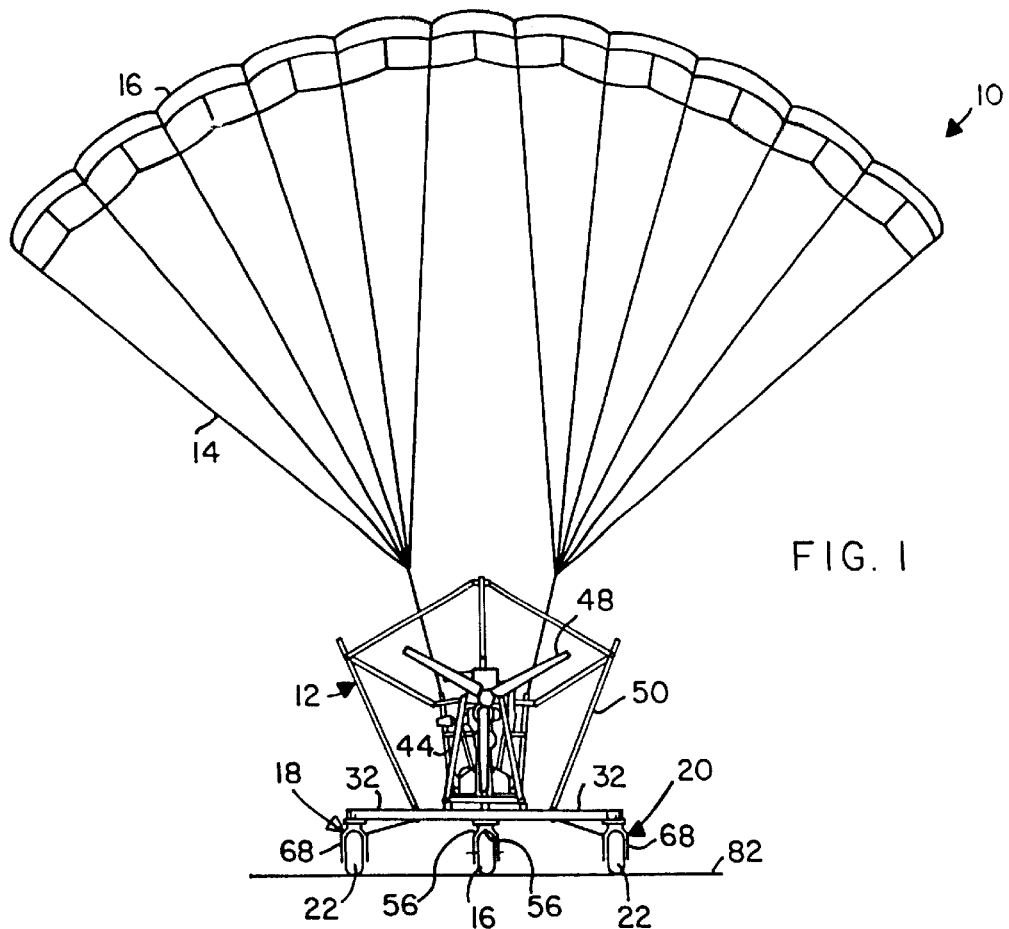
FIG. 1 is a rear elevational view of a motorized paraglider having a steering system in accordance with the present invention.

Referring now to the FIGS., a motorized paraglider 10 is shown having a wheeled frame 12 connected by lanyards 14 to a lift-producing canopy 16. The frame 12 has a tricycle configuration with a steerable nose wheel 16 and a pair of casters 18 and 20 with trailing wheels 22 capable of turning only outward. When a crosswind indicated, for example, by arrows 26 hits paraglider 10 while on a takeoff or landing run so as to lift caster 20 from the ground, caster 18 will automatically turn outward toward the direction of wind travel thereby permitting frame 12 to track sideways and remain beneath canopy 16 in a stable configuration. When crosswind 26 diminishes or frame 12 leaves the ground, a tensioned spring 28 will return wheel 22 of caster 18 to its normal position with its axle 30 oriented it right angles to the longitudinal axis of frame 12.

Frame 12 includes a central spar 30 from the rear of which a pair of struts 32 extend outwardly to form a "Y" shape. A pair of lateral spars 34 and 36 extends outwardly from the inner ends of struts 32 parallel to central spar 30. A plurality of cross members as at 38 tie lateral spars 34 and 36 to central spar 30. Central spar 30 defines the longitudinal axis or centerline of frame 12.

Secured to the front end of spars 30, 34 and 36 is a seat 40 for a pilot. Behind seat 40, an intertwined canopy anchor 42 and motor mount 44 are secured to the rear end of spars 30, 34 and 36. An internal combustion engine 46 having a rotatable propeller 48 is positioned atop mount 44. Propeller 48 is oriented for rotation in a plane substantially normal to the longitudinal axis of frame 12. A propeller guard 50 surrounds propeller 48 to prevent lanyards 14 and canopy 16 from becoming fouled therein.

Nose wheel 16 is affixed to the front end of central spar 30. Wheel 16 rotates on an axle 52 whose opposite ends are affixed to the bottoms of a pair of legs 54 of a support bracket 56. The tops of legs 54 are connected by a crosspiece 58 so as to provide support bracket 56 with an inverted "U" shape. Extending outwardly from the sides of legs 54 are foot pedals 60 with which a pilot may manually turn wheel 16 and steer frame 12 while it is on the ground. To permit the bracket 56 and wheel 16 to be turned about its vertical axis, a swivel mechanism 62 joins crosspiece 58 to central spar 30.

Casters 18 and 20 are mirror images of one another and have a construction similar to that of nose wheel 16. Casters 18 and 20 have wheels 22 that rotate on axles 30 whose ends are affixed to the bottoms of legs 64 and 66 of a support bracket 68 with an inverted "U" shape. The tops of legs 64 and 66 are connected together by a crosspiece 70 which, in turn, is connected by a swivel mechanism 72 to the outer end of one of struts 32. Each swivel mechanism 72 permits a wheel 22 to be turned about a substantially vertical axis.

A lever arm 74 is attached to each leg 66 and extends forwardly and rearwardly therefrom. The rearward end of each lever arm 74 is attached by means of inelastic tether 76 to the midpoint of the adjacent strut 32. Each tether 76 has a length which prevents the wheel 22 associated therewith from turning inwardly toward central spar 30 and, thus, serves as a stop.

The forward end of each lever arm 74 is connected by an elastic tether 78 to the midpoint of the adjacent strut 32. Each tether 78 has a coiled spring 28 at its outer end from which a connecting rod 80 extends back to a strut 32. Tether 78 is sized such that spring 28 is under constant tension, keeping rod 80 in a taut condition and wheel axle 30 normally at right angles to the longitudinal axis of frame 12. Should wheel axle 30 deviate from a right angle orientation under the influence of a crosswind, spring 28 will attempt to return wheel 22 to its normal orientation.

Use of paraglider frame 12 is straightforward. First, frame 12 is wheeled to an appropriate runway, and canopy 16 is secured by lanyards 14 to frame 12. Next, with canopy 16 trailing behind frame 12, engine 46 is energized to spin propeller 48 and drive frame 12 forward. In the usual manner, frame 12 is, then, permitted to move forward over the ground under the influence of increasing thrust from propeller 48 such that canopy 16 generates lift and rises above frame 12. If the lift is sufficient, paraglider 48 will rise from the ground and may be flown conventionally by manipulation of lanyards 14 and the thrust generated by propeller 48.

Figure 2:
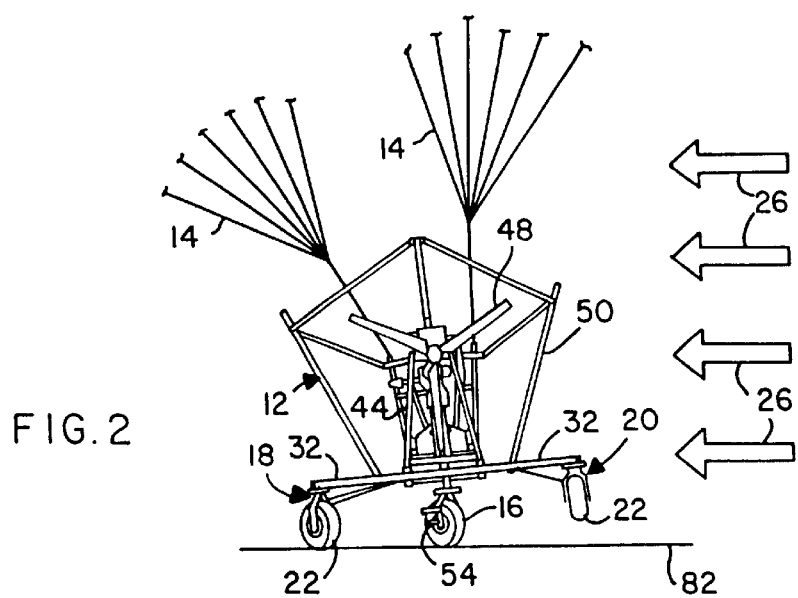
FIG. 2 is a rear elevational view of the motorized paraglider of FIG. 1 with portions broken away and being tilted by a crosswind.

Should a crosswind 26 be present during takeoff, there is a possibility that frame 12 may be pulled over by canopy 16 before leaving the ground surface 82. One or the other of casters 18 or 20 leaving the ground will always precede such an event. If caster 20 leaves the ground 82 as illustrated in FIG. 2, then the opposite caster 18 will automatically turn outwardly thereby permitting frame 12 to track with the wind and prevent canopy 16 from gaining an off-centered position that can upset frame 12. By manipulation of foot pedals 60, a pilot would steer nose wheel 16 in a similar direction to prevent frame 12 from veering back into crosswind 26 and maintain frame 12 in an orientation directly down the runway. Like steps would be followed, of course, during a crosswind landing.

Because the takeoff and landing roll of the paraglider 10 is relatively short, measured in tens of feet, any sideways tracking of frame over the ground caused by crosswind 26 will be minimal—a few feet at most. Under normal takeoff and landing conditions such sideways movement is of little moment. The alternative, no sideways movement, can lead to property loss and physical harm to the pilot should frame 12 be pulled onto its side on the ground 82 by canopy 16 caught in crosswind 26.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A motorized paraglider, comprising:
    a wheeled frame having a steerable nose wheel at the front thereof and a pair of casters at the rear thereof arranged in a tricycle configuration, each of said casters including:
        a trailing wheel for engagement with the ground;
        a support bracket rotatably carrying said trailing wheel;
        a swivel mechanism being positioned atop said support bracket for permitting said support bracket and said trailing wheel to swivel about a substantially vertical axis;
        a stop being coupled with said support bracket for preventing said trailing wheel from turning inwardly; and,
        a spring being coupled with said support bracket for normally urging said support bracket against said stop yet, under the influence of a sufficient lateral force, permitting said support bracket and said trailing wheel to swivel outwardly;
    a seat for a pilot being secured atop said frame;
    a canopy anchor being secured to said frame rearwardly of said seat;
    a motor, having a rotatable propeller for driving said paraglider, being secured to said frame rearwardly of said canopy anchor.

2. A motorized paraglider, comprising:
    a wheeled frame having:
        a central spar with a front end and a rear end;
        a pair of struts each of which having an inner end attached to said rear end of said central spar and an outer end positioned remote therefrom;
        a steerable nose wheel secured to said front end of said central spar;
        a pair of casters each being respectively secured to said outer end of one of said struts, each of said casters including:
            a trailing wheel for engagement with the ground;
            a support bracket rotatably carrying said trailing wheel;
            a swivel mechanism being positioned atop said support bracket for permitting said support bracket and said trailing wheel to swivel about a substantially vertical axis;
            a lever arm being attached to said support bracket and having forward and rearward ends;
            an inelastic tether connecting said rearward end of said lever arm to the adjacent one of said struts between said inner and outer ends thereof and having a length sufficient to prevent said trailing wheel from turning inwardly; and,
            an elastic tether connecting said forward end of said lever arm to the adjacent one of said struts between said inner and outer ends thereof, said elastic tether normally urging said rearward end of said lever arm against said inelastic tether yet, under the influence of a sufficient lateral force, permitting said support bracket and said trailing wheel to swivel outwardly;
    a seat for a pilot being secured atop said wheeled frame;
    a canopy anchor being secured to said wheeled frame rearwardly of said seat;
    a motor, having a rotatable propeller for driving said paraglider, being secured to said wheeled frame rearwardly of said canopy anchor.

3. A motorized paraglider, comprising:
    a wheeled frame having:
        a central spar with a front end and a rear end;
        a pair of struts each of which having an inner end attached to said rear end of said central spar and an outer end positioned remote therefrom;
        a steerable nose wheel secured to said front end of said central spar;

a pair of casters each being respectively secured to said outer end of one of said struts, each of said casters including:
  a trailing wheel for engagement with the ground;
  a support bracket rotatably carrying said trailing wheel;
  a swivel mechanism being positioned atop said support bracket for permitting said support bracket and said trailing wheel to swivel about a substantially vertical axis;
  a lever arm being attached to said support bracket and having forward and rearward ends;
  an inelastic tether connecting said rearward end of said lever arm to the adjacent one of said struts between said inner and outer ends thereof and having a length sufficient to prevent said trailing wheel from turning inwardly; and,
  an elastic tether connecting said forward end of said lever arm to the adjacent one of said struts between said inner and outer ends thereof, said elastic tether normally urging said rearward end of said lever arm against said inelastic tether yet, under the influence of a sufficient lateral force, permitting said support bracket and said trailing wheel to swivel outwardly;

a seat for a pilot being secured atop said wheeled frame;

a canopy anchor being secured to said wheeled frame rearwardly of said seat;

a lift-generating canopy connected by lanyards to said canopy anchor; and, a motor, having a rotatable propeller for driving said paraglider, being secured to said wheeled frame rearwardly of said canopy anchor.

* * * * *